(12) United States Patent
Osaka

(10) Patent No.: US 9,453,999 B2
(45) Date of Patent: Sep. 27, 2016

(54) PHOSPHOR COLOR WHEEL AND PROJECTION DISPLAY DEVICE INCLUDING SAME

(75) Inventor: Akihiro Osaka, Tokyo (JP)

(73) Assignee: NEC DISPLAY SOLUTIONS, LTD., Tokyo (JP)

(*) Notice: Subject to any disclaimer, the term of this patent is extended or adjusted under 35 U.S.C. 154(b) by 133 days.

(21) Appl. No.: 14/125,519

(22) PCT Filed: Jun. 16, 2011

(86) PCT No.: PCT/JP2011/063807
§ 371 (c)(1),
(2), (4) Date: Dec. 11, 2013

(87) PCT Pub. No.: WO2012/172672
PCT Pub. Date: Dec. 20, 2012

(65) Prior Publication Data
US 2014/0104583 A1 Apr. 17, 2014

(51) Int. Cl.
*F21V 14/08* (2006.01)
*G02B 26/00* (2006.01)
*G03B 21/16* (2006.01)
*G03B 21/20* (2006.01)

(52) U.S. Cl.
CPC .......... *G02B 26/008* (2013.01); *G03B 21/16* (2013.01); *G03B 21/204* (2013.01)

(58) Field of Classification Search
CPC .................... F21V 14/08; F21V 9/16
USPC .................... 353/84, 20; 362/84
See application file for complete search history.

(56) References Cited

U.S. PATENT DOCUMENTS

| 2006/0238717 A1* | 10/2006 | Maximus et al. ............ 353/30 |
| 2009/0284148 A1 | 11/2009 | Iwanaga |
| 2010/0328632 A1 | 12/2010 | Kurosaki et al. |

FOREIGN PATENT DOCUMENTS

| JP | 2005-345767 A | 12/2005 |
| JP | 2007-507755 A | 3/2007 |
| JP | 2009-277516 A | 11/2009 |
| JP | 2010-164846 A | 7/2010 |
| JP | 2011-013313 A | 1/2011 |
| JP | 2011-053969 A | 3/2011 |
| JP | 2011-108502 A | 6/2011 |
| JP | 2011108502 * | 6/2011 ............. F21S 2/00 |

OTHER PUBLICATIONS

Translation of Takashi 2011108502.*
International Search Report (ISR) (PCT Form PCT/ISA/210), in PCT/JP2011/061932, dated Sep. 6, 2011.
Japanese Office Action dated Oct. 16, 2014 with an English translation thereof.

* cited by examiner

*Primary Examiner* — William C Dowling
*Assistant Examiner* — Jerry Brooks
(74) *Attorney, Agent, or Firm* — McGinn IP Law Group, PPLC

(57) ABSTRACT

Phosphor color foil 1 comprises glass substrate 2, rotary motor 3 for rotating glass substrate 2, and phosphor (first phosphor) 5 annularly applied on the surface of glass substrate 2. The center of the applied region of phosphor 5 is different from the rotational center of glass substrate 2. The center of one or both of outer boundary line 5a and inner boundary line 5b of the applied region of phosphor 5 is different from the rotational center of glass substrate 2. Center axis 6 of glass substrate 2 is separated from the rotational center. Another phosphor (second phosphor) 9 is annularly applied adjacently to and inside or outside the applied region of phosphor 5.

8 Claims, 5 Drawing Sheets

PHOSPHOR COLOR WHEEL AND PROJECTION DISPLAY DEVICE INCLUDING SAME

TECHNICAL FIELD

The present invention relates to a phosphor color foil for emitting, from a phosphor, light having a wavelength different from that of excitation light emitted from a light source, and a projection display device including the phosphor color foil.

BACKGROUND ART

The brightness of the projection display device including an illumination optical system including a light source, a light valve (display device), and a projection optical system is mainly determined by the etendue of the light source, the brightness of the light source, the transmittance of each optical system, and the etendue of the projection optical system. When the etendue of the light source and the etendue of the projection optical system match each other, the efficiency of the entire projection display device is determined by the transmittance of each optical system. However, when the etendue of the light source and the etendue of the projection optical system do not match each other, losses occur due to a factor other than the transmittance of each optical system among the aforementioned factors that determine the brightness of the projection display device. Consequently, the efficiency of the entire projection display device is lower.

The etendue of the light source is determined by a product of the light-emitting area and the light-emitting angle of the light source. In other words, in the case of a surface-emitting light source such as a LED (light-emitting diode), the etendue $E_{Light}$ is expressed by the following formula (refer to Patent Document 1):

$$E_{Light} = \pi A_{Light} \sin^2(\theta_{Light})$$

($A_{Light}$: light-emitting area of light source, $\theta_{Light}$: maximum light-emitting angle of light source)

The etendue $E_{MD}$ of the projection optical system is determined by the size of the display unit of the light valve and the F-number of a projection lens as follows (refer to Patent Document 2):

$$E_{MD} = \pi A_{MD}/4(F/\#)^2$$

($A_{MD}$: surface area of light valve, F/#: F-number of projection lens)

To prevent wasteful loss of the light emitted from the light source at the projection optical system, it is desired that the etendue $E_{Light}$ of the light source and the etendue $E_{MD}$ of the projection optical system match each other or the etendue $E_{MD}$ of the projection optical system be larger than the etendue $E_{Light}$ of the light source. This means that the light-emitting area or the light-emitting angle of the light source is desirably small.

As in the case of a configuration including a DMD (digital micromirror device) as the light valve, in a projection display device where there is no need to align polarization, it can be said that the etendue $E_{Light}$ of the light source and the etendue $E_{MD}$ of the projection optical system match each other at the time of $E_{Light} \leq E_{MD}$.

On the other hand, as in the case of a configuration including a LCD panel (liquid crystal display panel) as the light valve, in a projection display device where it is necessary to align polarization, the etendue of the light source is effectively double, and thus it can be said that the etendue $E_{Light}$ of the light source and the etendue $E_{MD}$ of the projection optical system match each other at the time of $E_{Light} \leq E_{MD}$.

A high-pressure mercury lamp is mainly used as the light source of the projection display device. However, a need has arisen for a light source that does not include any environmental pollutants such as mercury, and a LED and a laser light source are now focuses of attention as candidates for next generation light source.

The LED has characteristics in which etendue $E_{Light}$ of the light source is larger than that of a high pressure mercury lamp and in which the light emitting efficiency is lower than that of a high pressure mercury lamp because of a large light emitting area. Thus, to realize a projection display device equal in brightness to the high-pressure mercury lamp by using the LED, the etendue $E_{MD}$ of the projection optical system must be increased. For example, the size of the display unit of the light valve is increased. This consequently leads to enlargement of the entire device or to a cost increase.

On the other hand, the laser light source has characteristics in which etendue $E_{Light}$ of the light source is much smaller than that of a high pressure mercury lamp and in which light emitting efficiency is higher than that of a high pressure mercury lamp because of a very small light emitting area. Accordingly, when the laser light source is used, the etendue $E_{MD}$ of the projection optical system can be reduced more than when the high-pressure mercury lamp is used. Thus, the entire device can be miniaturized, and high efficiency and low costs can be achieved. However, severe restrictions such as safety standards are imposed on the laser light source, and all products including laser light sources cannot be freely made commercially available. Only products that comply with restrictions, such as safety standards, can be made commercially available. As a result, there is a limit on the brightness of the commercially available projection display device.

To overcome problems in the projection display device that includes such two types of next-generation light sources (LED and laser light source), a projection display device that includes a novel light source configured to use a laser as excitation light and to convert a wavelength and emit light by a phosphor has been developed. This novel light source has a light-emitting area that is smaller than that of the LED, and the etendue $E_{Light}$ of the light source is smaller than that of the LED but larger than that of the laser light source. While dependent on the efficiency of the laser as the excitation light, light-emitting efficiency is higher than that of the LED, particularly in the case of a green laser, and equal to that of the LED in the case of a red laser. Thus, when a configuration where a green light source is a laser light source for emitting light from a phosphor by using a laser as excitation light is employed, a projection display device that is smaller and brighter than a configuration, where the light sources of all three colors of red, green, and blue are LEDs, can be realized. Such a projection display device can achieve brightness equal to that of an existing projection display device including a mercury lamp when such a projection display device has almost same size as the existing projection display device. Further, when the light sources of all three colors of red, green, and blue are laser sources for emitting light from a phosphor by using a laser as excitation light, common use of one laser light source among the respective colors can reduce the number of laser light sources, and thus is effective for achieving lower costs.

The light output of the laser necessary in such a novel light source for converting a wavelength and emitting light at a phosphor using the laser as excitation light is several W to several tens of W. The spot size of a laser to be applied is very small (equal to or less than about 1 mm$^2$) Consequently, in a configuration where a phosphor is applied on a glass substrate or an aluminum substrate to be fixed, the phosphor and a binder necessary for applying the phosphor are burned away by heat accompanying the laser irradiation. To deal with this problem, in Patent Documents 3 and 4, a phosphor color foil prepared by applying a phosphor on a disk-shaped glass substrate or aluminum substrate is used. When the laser is applied while rotating the phosphor color foil, the laser is not continuously applied only to the same phosphor particles but is applied to phosphor particles that are irradiated with the laser and that sequentially change accompanying the rotation of the color foil. As a result, even when the laser having a light output of several tens of W is applied to the phosphor, the phosphor can be used without any deterioration in its characteristics.

PRIOR ART DOCUMENTS

Patent Documents

Patent Document 1: JP2005-345767A
Patent Document 2: JP2007-507755A
Patent Document 3: JP2009-277516A
Patent Document 4: JP2011-13313A

SUMMARY OF THE INVENTION

Problems to be Solved by the Invention

Generally, when the phosphor color foil is used, and lasers of two colors or more are applied to the same phosphor by changing timing, as shown in FIGS. 1a-1b, the applied region of the phosphor on substrate 100 is divided into a plurality of segments 101a and 101 b according to the number of colors of the used lasers, and the center angles of segments 101a and 101b are determined according to the incident time of the lasers of the respective colors. In other words, in one phosphor color foil, segments 101a and 101b, to which the laser is applied, are formed for the respective colors. Different phosphors are applied on segments 101a and 101b corresponding to the respective colors. FIG. 1a shows, by a broken line, locus 103 of an irradiated position when laser irradiation is performed while rotating substrate 100 by rotary motor 102.

As shown in FIGS. 2a-2b, there is a configuration where identical phosphors are applied on the plurality of segments 101a and 101b corresponding to the respective colors of the phosphor color foil, and diffusion plate 104 is disposed in selected segment 101b.

However, it is difficult to use any of the phosphor color foils of the configurations shown in FIGS. 1a-2b in a general purpose manner in various projection display devices whose performance varies from device to device. When a phosphor color foil suited to a specific projection display device is used for a projection display device having a laser light source whose brightness differs from that of the specific projection display device, or for a projection display device having a LED, which is used in combination with a laser light source, whose brightness differs from that of the specific projection display device, there is a possibility that light of an appropriate color will not be generated. When the incident time of excitation light (laser or the like) on each segment of the phosphor color foil is determined so that the distribution of the light amount of each color (red, green, or blue) can be optimal in a specific projection display device, the ratio of the incident time of excitation light on each segment is always constant in the other projection display device. If the phosphor color foil is used in a projection display device including a light source (laser light source or LED) for applying brighter light, there is a possibility that the incident time of the light from the brighter light source on the phosphor will be too long. Conversely, if the phosphor color foil is used in a projection display device including a light source for applying darker light, there is a possibility that the incident time of the light from the darker light source on the phosphor will be too short. In such a case, a balance on light amount among the respective colors (red, green, and blue) will be broken, which will lead to change in the white-color chromaticity coordinates.

To prevent changing of the white-color chromaticity coordinates in such a case, individually adjusted phosphor color foils must be used for the respective projection display devices so that the distribution of the light amount of each color can be constant. In other words, phosphor color foils in which the size of each is segment different must be prepared for the respective projection display devices.

Thus, in the configuration where the lasers are applied to the different segments for each color of the phosphor color foil, the same phosphor color foil cannot be commonly used among the projection display devices including light sources different in performance. This necessitates preparation of a dedicated phosphor color foil for each projection display device, and thus manufacturing costs are high. In particular, it is extremely inefficient to have to produce a wide variety of projection display devices in small quantities.

It is therefore an object of the present invention to provide a general-purpose phosphor color foil capable of solving the aforementioned problems and widely and commonly usable in various projection display devices, and a projection display device including the same.

Means to Solve the Problems

A phosphor color foil according to the present invention comprises a substrate driven to rotate and a phosphor annularly applied on the surface of the substrate, and is characterized in that the center of the applied region of the phosphor is different from the rotational center of the substrate. The annular shape in this case is not limited to a perfect circle shape.

A projection display device according to the present invention comprises: an illumination optical system including the aforementioned phosphor color foil, rotary driving means for driving the substrate to rotate, and a light source for applying excitation light to the phosphor color foil; a light valve for modulating light incident from the illumination optical system according to an image signal; and a projection optical system for projecting the light modulated by the light valve to an external screen. The light source is disposed so that a locus of the excitation light applied from the light source during rotation of the phosphor color foil is formed over the inside and the outside of the applied region of the phosphor on the substrate of the phosphor color foil. The phosphor emits fluorescent light different in wavelength from the excitation light when irradiated with the excitation light from the light source.

The color foil may be configured such that another phosphor will be annularly applied adjacently to and inside or outside the applied region of the phosphor. In such a case, a projection display device according to the present invention comprises: an illumination optical system including the phosphor color foil, rotary driving means for driving the substrate to rotate, and a light source for applying excitation light to the phosphor color foil; a light valve for modulating light incident from the illumination optical system according to an image signal; and a projection optical system for projecting the light modulated by the light valve to an external screen. The light source is disposed so that a locus of the excitation light applied from the light source during rotation of the phosphor color foil be formed over the applied region of the phosphor on the substrate of the phosphor color foil and an applied region of the other phosphor. The phosphor emits fluorescent light different in wavelength from the excitation light when irradiated with the excitation light from the light source, and the other phosphor emits another fluorescent light different in wavelength from both the excitation light and the fluorescent light emitted from the phosphor when irradiated with the excitation light from the light source.

A projection display method according to the present invention comprises: applying excitation light to a substrate to draw a locus over the inside and the outside of an applied region of a phosphor while rotating the substrate on a surface on which the phosphor has been annularly applied; and emitting, from the phosphor, fluorescent light different in wavelength from the excitation light when the excitation light enters the applied region of the phosphor, and inhibiting emission of any light from the phosphor when the excitation light enters the outside of the applied region of the phosphor.

Another projection display method according to the present invention comprises: applying excitation light to a substrate to draw a locus over an applied region of a phosphor and an applied region of another phosphor while rotating the substrate on a surface on which the phosphor has been annularly applied and on which the other phosphor has been annularly applied adjacently to and inside or outside the applied region of the phosphor; and emitting, from the phosphor, fluorescent light different in wavelength from the excitation light when the excitation light enters the applied region of the phosphor, and emitting, from the other phosphor, another fluorescent light different in wavelength from both the excitation light and the fluorescent light emitted from the phosphor when the excitation light enters the applied region of the other phosphor.

According to these projection display methods, the irradiated position of the excitation light with respect to the substrate can be adjusted by adjusting relative positions of the substrate and a light source for emitting the excitation light.

Effects of the Invention

According to the present invention, the same phosphor color foil can be commonly used in a plurality of projection display devices different in type and performance, for example, a plurality of projection display devices including light sources different in brightness, and appropriate color generation is enabled in each projection display device. Since there is no need to design and manufacture a phosphor color foil dedicated to each projection display device, manufacturing costs can be reduced.

DESCRIPTION OF EXEMPLARY EMBODIMENTS

Figures 1A, 1B:
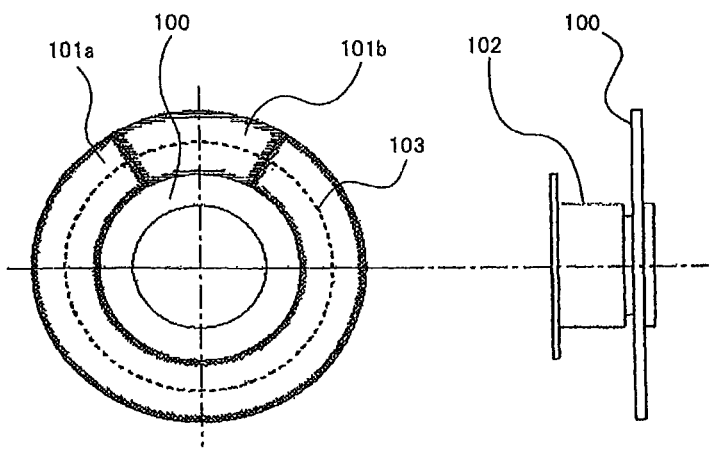
FIG. 1a is a front view showing a phosphor color foil and a rotary motor according to a first related art.
FIG. 1b is a side view thereof.
Figures 2A, 2B:
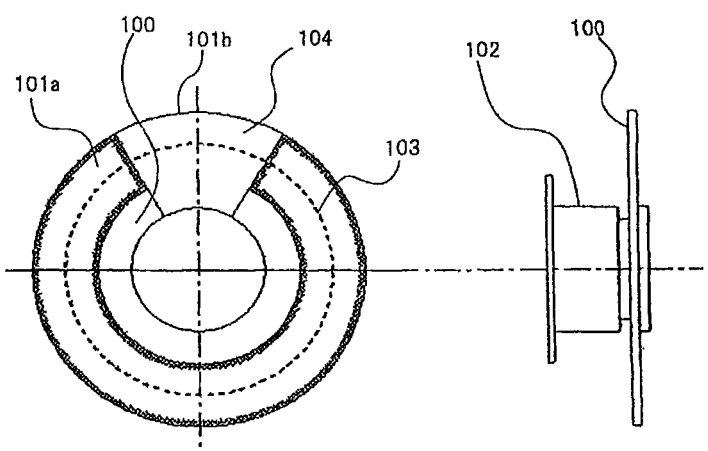
FIG. 2a is a front view showing a phosphor color foil and a rotary motor according to a second related art.
FIG. 2b is a side view thereof.

Hereinafter, the embodiments of the present invention will be described referring to the drawings.

First Exemplary Embodiment

Figure 3A:
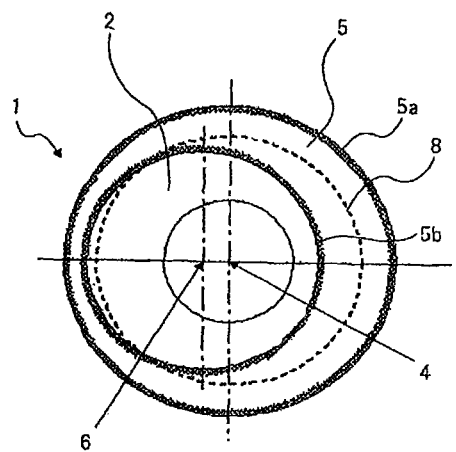
FIG. 3a is a front view showing a phosphor color foil and a rotary motor according to the first exemplary embodiment of the present invention.
Figure 3B:
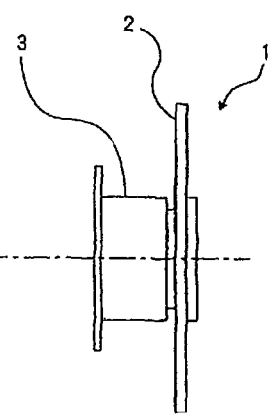
FIG. 3b is a side view thereof.

FIGS. 3a-3b shows phosphor color foil 1 according to the first exemplary embodiment of the present invention. Phosphor color foil 1 is configured such that disk-shaped glass substrate 2 is attached to rotary motor (rotary driving means) 3, and the center axis of glass substrate 2 matches rotational axis 4 of rotary motor 3. Glass substrate 2 includes an optical multilayer film having the characteristics of transmitting excitation light and reflecting light excited by excitation light. Further, phosphor (first phosphor) 5 is applied on the optical multilayer film. Phosphor 5 is, for example, a phosphor for wavelength-converting blue light into green light. The applied region of phosphor 5 is an annular region surrounded with outer boundary line 5a and inner boundary line 5b. Outer boundary line 5a and inner boundary line 5b are circles having centers, and the centers are made eccentric. In other words, the center axis of outer boundary line 5a and the center axis of inner boundary line 5b are shifted from each other. In this exemplary embodiment, outer boundary line 5a of phosphor 5 and glass substrate 2 are concentric to each other, the center axes of both match each other, and also match rotational axis 4 of rotary motor 3. On the other hand, center axis 6 of inner boundary line 5b does not match rotational axis 4 of rotary motor 3. As a result, the applied region of phosphor 5 is formed into a distorted annular shape wide on one side (right side in FIG. 3a) and narrow (left side in FIG. 3a) on its opposite side. Desirably, the center axis of outer boundary line 5a and center axis 6 of inner boundary line 5b are separated from each other by 2 mm or more.

The excitation light is applied to phosphor color foil 1. Glass substrate 2 is rotated by rotary motor 3. Thus, the irradiated position of the excitation light on glass substrate 2 draws circular locus 8 on glass substrate 2. Locus 8 is a circle around rotational axis 4, and concentric to the outline of glass substrate 2 and outer boundary line 5a of phosphor 5. On the other hand, the center of locus 8 does not match that of inner boundary line 5b. As described above, the applied region of phosphor 5 is formed into the distorted annular shape where a width changes. As a result, as shown in FIGS. 3a-3b, only a part of locus 8 of the irradiated position of the excitation light passes through the inside of the applied region of phosphor 5 while the other passes through the outside of the applied region of phosphor 5. In other words, locus 8 of the excitation light during the rotation of phosphor color foil 1 is formed over the inside of the applied region of phosphor 5 and the outside of the applied region of phosphor 5.

When the excitation light (e.g., blue laser) is applied to phosphor color foil 1 during the rotation of phosphor color foil 1 according to this exemplary embodiment, incidence and nonincidence on phosphor 5 are periodically repeated. When there is excitation light incident on phosphor 5, phosphor 5 is excited to emit green fluorescent light. The green fluorescent light traveled toward glass substrate 2 is reflected by the optical multilayer film. On the other hand, when the excitation light does not enter phosphor 5, the excitation light is transmitted through glass substrate 2. The size and the shape of the applied region of phosphor 5 and the irradiated position of phosphor color foil 1 with the excitation light are determined so that the emission time and the nonemission time of the green fluorescent light can be appropriate.

Figure 4A:
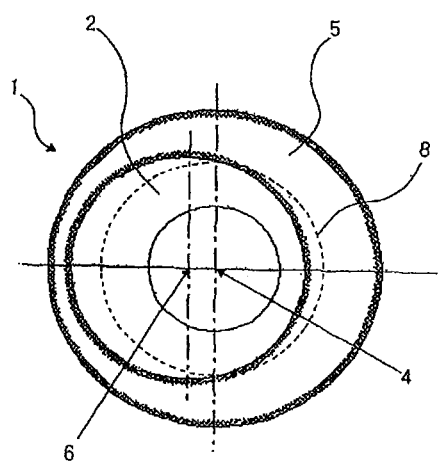
FIG. 4a is a front view showing a state where the phosphor color foil and the rotary motor shown in FIGS. 3a-3b are included in another device.
Figure 4B:
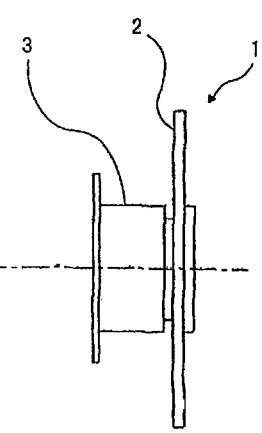
FIG. 4b is a side view thereof.

In addition, without changing the phosphor color foil, the generation time of the fluorescent light can be controlled based on the irradiated position of phosphor color foil 1 with the excitation light. As shown in FIGS. 4a-4b, the irradiated position of phosphor color foil 1 with the excitation light is set closer to the center side. Accordingly, the radius of locus 8 drawn by the irradiated position of the excitation light is reduced and, as a result, the part of the excitation light brought into contact with phosphor 5 is smaller. In other words, the incident time of light irradiated on phosphor 5 with the excitation light is shortened to extend nonirradiation time. The emission time of the fluorescent light is accordingly shorter. Conversely, when the irradiated position of phosphor color foil 1 with the excitation light is set further from its center, the irradiation time of phosphor 5 with the excitation light is longer, and the emission time of the fluorescent light is also longer. This means that the emission time of the fluorescent light can be controlled based on the irradiated position of phosphor color foil 1 with the excitation light.

Accordingly since there is no need to create any dedicated phosphor color foil for each projection display device, but one phosphor color foil 1 can be used in a general-purpose manner, this contributes to reduction of manufacturing costs. In other words, even in the case of manufacturing a plurality of types of projection display devices, there is no need to keep a variety of phosphor color foils 1 in stock, but any model change of the projection display device can be quickly and easily dealt with.

Second Exemplary Embodiment

Figure 5A:
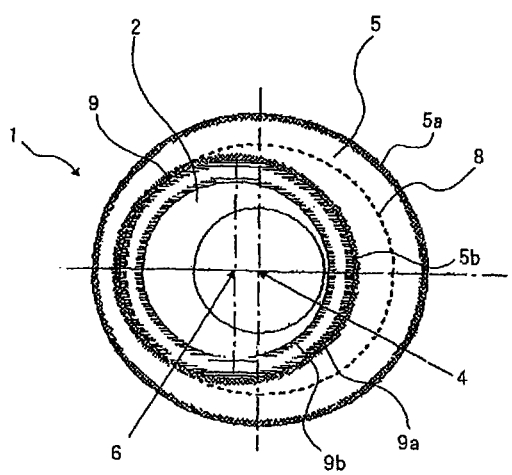
FIG. 5a is a front view showing a phosphor color foil and a rotary motor according to the second exemplary embodiment of the present invention.
Figure 5B:
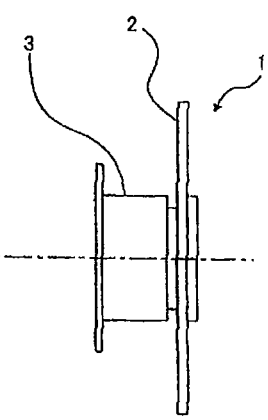
FIG. 5b is a side view thereof.

FIGS. 5a-5b shows phosphor color foil 1 according to the second exemplary embodiment of the present invention. In this exemplary embodiment, as in the case of the first exemplary embodiment, another phosphor (second phosphor) 9 for wavelength-converting blue light into red light is annularly applied adjacently to and inside the annular applied region of phosphor (first phosphor) 5 for wavelength-converting blue light into green light. The center axes 6 of outer boundary line 9a and inner boundary line 9b of the applied region of second phosphor 9 are equal to the center axis of inner boundary line 5b of the applied region of first phosphor 5. Inner boundary line 5b of the applied region of first phosphor 5 and outer boundary line 9a of second phosphor 9 can match each other. The area of the applied region of first phosphor 5 is larger than that of the applied region of second phosphor 9.

As in the case of the first exemplary embodiment, when the phosphor color foil rotated around rotational axis 4 is irradiated with excitation light, irradiation and nonirradiation of first phosphor 5 with light are periodically repeated. At this time, the light that is not applied to first phosphor 5 is applied to second phosphor 9. Specifically, in this exemplary embodiment, locus 8 of the excitation light during the rotation of phosphor color foil 1 is fainted over the applied region of first phosphor 5 and over the applied region of second phosphor 9 and a state where blue excitation light (laser) is applied to first phosphor 5 to emit green fluorescent light and a state where the blue light is applied to second phosphor 9 to emit red fluorescent light are alternately and periodically repeated. The green light and the red light are both reflected by the optical multilayer film of a glass substrate.

With this configuration, by appropriately setting the applied region of first phosphor 5 and the applied region of second phosphor 9, and by controlling the incident time (emission time of green fluorescent light) of first phosphor 5 and the incident time (emission time of red fluorescent light) of second phosphor 9 with the excitation light, allocation of the green light emission time and the red light emission time can be appropriately set. Further, the allocation of the green light emission time and the red light emission time can be controlled based on the distance from the rotational center of phosphor color foil 1 to the irradiated position of the excitation light.

By switching the applied region of first phosphor 5 with the applied region of second phosphor 9, second phosphor 9 can be applied on the inner side of the applied region of first phosphor 5. In other words, the applied region of second phosphor 9 can be present adjacently to and inside or outside the applied region of first phosphor 5.

Third Exemplary Embodiment

Figure 6A:
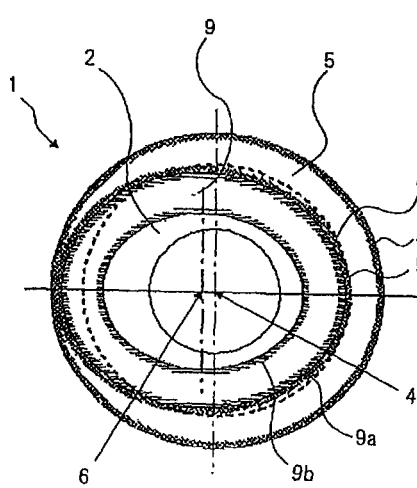
FIG. 6a is a front view showing a phosphor color foil and a rotary motor according to the third exemplary embodiment of the present invention.
Figure 6B:
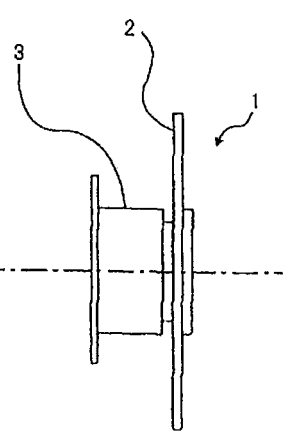
FIG. 6b is a side view thereof.

FIGS. 6a-6b shows phosphor color foil 1 according to the third exemplary embodiment of the present invention. In this exemplary embodiment, inner boundary line 5a of the applied region of first phosphor 5 is elliptic, and outer boundary line 9a and inner boundary line 9b of the applied region of second phosphor 9 located adjacently to and inside the applied region of first phosphor 5 are also elliptic along inner boundary line 5a of the applied region of first phosphor 5. Inner boundary line 5a of the applied region of first phosphor 5 and outer boundary line 9a and inner boundary line 9b of the applied region of second phosphor 9 have a common center, and the axis (center axis 6) that passes through this center is separated from rotational axis 4 of rotary motor 3.

This exemplary embodiment provides the same effects as those of the second exemplary embodiment.

Fourth Exemplary Embodiment

Figure 7A:
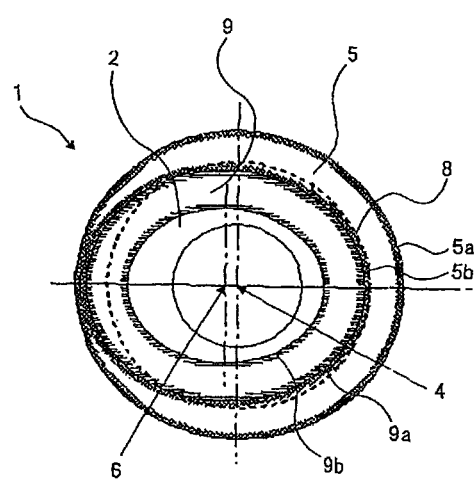
FIG. 7a is a front view showing a phosphor color foil and a rotary motor according to the fourth exemplary embodiment of the present invention.
Figure 7B:
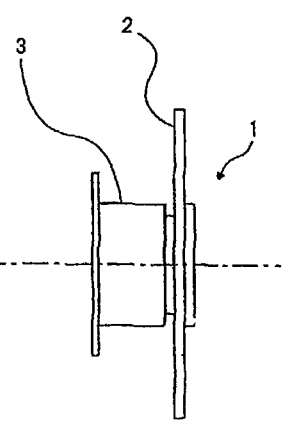
FIG. 7b is a side view thereof.

FIGS. 7a-7b shows phosphor color foil 1 according to the fourth exemplary embodiment of the present invention. In this exemplary embodiment, outer boundary line 5a and inner boundary line 5b of the applied region of first phosphor 5 and outer boundary line 9a and inner boundary line 9b of the applied region of second phosphor 9 all have common center axis 6. Center axis 6 is a center axis of glass substrate 2. Glass substrate 2 is attached to rotary motor 3 so that center axis 6 be located away from rotational axis 4 of rotary motor 3. Further, in this exemplary embodiment, a mechanism, not shown, capable of moving glass substrate 2 is disposed. By moving glass substrate 2 with respect to rotary motor 3, a space (deviation amount) between center axis 6 of glass substrate 2 and rotational axis 4 of rotary motor 6 can be adjusted. The movement of glass substrate 2 can be a discontinuous (staged) or continuous movement.

This exemplary embodiment provides the same operation effects as those of the third exemplary embodiment. In the first to third exemplary embodiments, in the case of shifting the irradiated position of phosphor color foil 1 with the excitation light in the radial direction, the position or the shape of the attaching portion of phosphor color foil 1 or a light source in a case, not shown, is changed. On the other hand, in this exemplary embodiment, the irradiated position can be shifted by adjusting the mechanism accessory to phosphor color foil 1. Thus, adjusting work is very easy, and no additional designing is necessary for the case itself.

[Projection Display Device]

Figure 8:
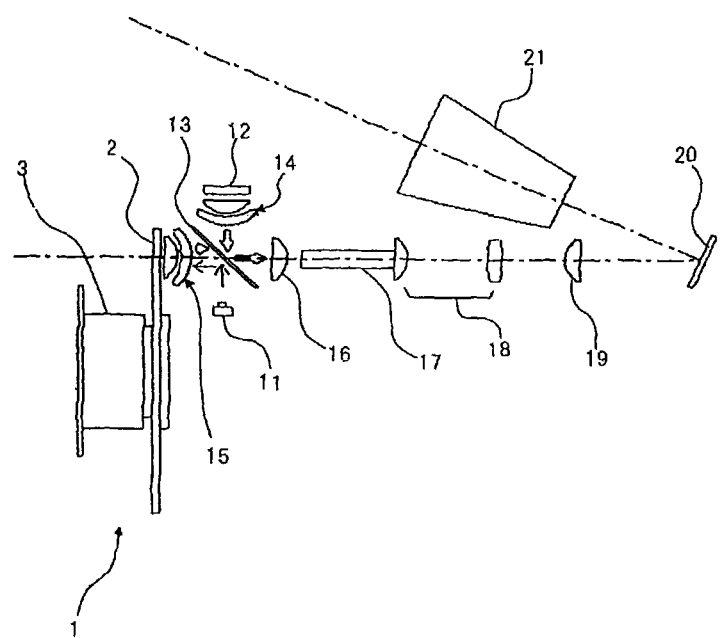
FIG. 8 is a schematic view showing an example of a projection display device according to the present invention.

FIG. 8 shows an example of a projection display device according to the present invention. This projection display device includes phosphor color foil 1 according to any one of the abovementioned second to fourth exemplary embodiments. The projection display device further includes, as a light source for emitting excitation light to be entered into phosphor color foil 1, laser light source 11 for emitting a blue laser. LED 12 is also included as a light source for emitting blue light. Dichroic mirror 13 is disposed in a position irradiated with the blue laser from laser light source 11 and the blue light from LED 12. Dichroic mirror 13 reflects the blue light while transmitting green light and red light. Collimator lens group 14 is disposed between LED 12 and dichroic mirror 13. Dichroic mirror 13 faces a part of glass substrate 2 of phosphor color foil 1 via collimator lens group 15. However, dichroic mirror 13 is located away from rotational axis 4 of rotary motor 3. On the opposite side of collimator lens group 15 and phosphor color foil 1 seen from dichroic mirror 13, condenser lens 16, rod lens 17, relay lens group 18, condenser lens 19, and DMD (digital micromirror device) 20 are sequentially arrayed. Projection lens 21 is disposed in the incident position of light reflected by DMD 20. Roughly, the units from phosphor color foil 1 and rotary motor 3 to condenser lens 19 constitute an illumination optical system, DMD 20 is a light valve (display device), and projection lens 21 is a projection optical system.

The blue laser emitted from laser light source 11 is reflected by dichroic mirror 13, and applied to glass substrate 2 of phosphor color foil 1 via collimator lens group 15. Since glass substrate 2 is rotated by rotary motor 3, as shown in FIG. 4a or the like, the irradiated position of the blue laser draws circular locus 8. Locus 8 is located over the applied region of first phosphor 5 and the applied region of second phosphor 9. The incident timing of the blue laser on first phosphor 5 and second phosphor 9 is synchronized with driving of DMD 20 by an electric circuit not shown. Accordingly, the blue laser enters first phosphor 5 when green displaying is performed, and the blue laser enters second phosphor 9 when red displaying is performed. When the blue displaying is performed, LED 12 is operated without operating laser light source 11. In this case, no excitation light is applied to phosphor color foil 1.

In the incident state of the blue laser from laser light source 11 on first phosphor 5, first phosphor 5 excited by the blue laser emits green fluorescent light. The green fluorescent light is diffused in all directions around the emission bright point of first phosphor 5, and a part thereof is reflected toward collimator lens group 15 by the optical multilayer film of glass substrate 2. The green fluorescent light emitted from first phosphor 5 is returned to an almost parallel ray by collimator lens group 15, and then enters dichroic mirror 13 again. Then, the green fluorescent light is transmitted through dichroic mirror 13 to travel to condenser lens 16.

In the incident state of the blue laser on second phosphor 9, second phosphor 9 excited by the blue laser emits red fluorescent light. The red fluorescent light is reflected by the optical multilayer film of glass substrate 2, converted almost parallel by collimator lens group 15, and then enters dichroic mirror 13 again. Then, the red fluorescent light is transmitted through dichroic mirror 13 to travel to condenser lens 16.

Further, the blue light from LED 12 is converted almost parallel by collimator lens group 14, and then enters dichroic mirror 13. The blue light from LED 12 is reflected by dichroic mirror 13 to travel to the opposite side of phosphor color foil 1, namely, condenser lens 16.

Accordingly, the green fluorescent light and the red fluorescent light from phosphor color foil 1 and the blue light from LED 12 enter dichroic mirror 13, and are synthesized by dichroic mirror 13. Further, these lights are condensed near the center of the incident side end surface of rod lens 17 by condenser lens 16, and are repeatedly reflected totally in rod lens 17. As a result, a rectangular uniform light distribution is formed on the emission side end surface of rod lens 17. The light uniformly distributed in a rectangular shape is applied to a rectangular region that is larger than the effective region of the display surface of DMD 20 via relay lens group 18 and condenser lens 19. Illumination light modulated by DMD 20 is projected to a screen not shown via projection lens 21. This is how the projection display device shown in FIG. 8 performs displaying.

An image that is formed in DMD 20 includes a combination of red (R), green (G), and blue (B). Accordingly, in the projection display device, the green fluorescent light and the red fluorescent light from phosphor color foil 1 and the blue light from LED 12 constitute a video. Thus, light is entered into DMD 20 by shifting timing among the colors. According to this timing, the operation timing of laser light source 11 and LED 12, the incident timing of the blue laser from laser light source 11 on first phosphor 5, and the incident timing on second phosphor 9 are determined. As a result, a desired image can be projected to the screen (not shown).

In the case of manufacturing a projection display device similar in configuration to that shown in FIG. 8 but different in performance of optical components other than phosphor color foil 1 (e.g., performance of laser light source 11), it may be desirable to change the ratio of the time of entering the laser (excitation light) into first phosphor 5 and the time of entering the laser into second phosphor 9. Such a case can be dealt with by moving a laser incident position on glass substrate 2 of phosphor color foil 1 in the radial direction of glass substrate 2. Specifically, in the case of phosphor color foil 1 according to the second to fourth exemplary embodiments, when the laser incident position is moved inside in the radial direction of glass substrate 2, the laser incident time on first phosphor 5 is shorter while the incident time on second phosphor 9 is longer. Conversely, when the laser incident position is moved outside in the radial direction of glass substrate 2, the laser incident time on first phosphor 5 is longer while the incident time on second phosphor 9 is shorter. Thus, according to this exemplary embodiment, by changing the laser incident position, one phosphor color foil 1 can be widely used in projection display devices having various characteristics in a general-purpose manner. Changing of the laser incident position is enabled by appropriately designing a case attaching structure in each projection display device. When there is a mechanism capable of moving glass substrate 2 with respect to rotary motor 3 as in the case of phosphor color foil 1 of the fourth exemplary embodiment, the laser incident position can be changed by using the mechanism, and there is no need to adjust the case attaching structure in the projection display device.

DESCRIPTION OF REFERENCE NUMERALS

1 Phosphor color foil
2 Glass substrate
3 Rotary motor (rotary driving means)
4 Rotational axis
5 Phosphor (first phosphor)
5a Outer boundary line
5b Inner boundary line
6 Center axis
8 Locus of light irradiated position
9 Another phosphor (second phosphor)
9a Outer boundary line
9b Inner boundary line
11 Laser light source
12 LED (light-emitting diode)
13 Dichroic mirror
14, 15 Collimator lens group
16 Condenser lens
17 Rod lens
18 Relay lens group
19 Condenser lens
20 DMD (digital micromirror device)
21 Projection lens

The invention claimed is:

1. A phosphor color wheel comprising:
a substrate driven to rotate; and
a phosphor annularly applied on a surface of the substrate,
wherein a center of an applied region of the phosphor is different from a rotational center of the substrate which is located in the substrate,
wherein the applied region of phosphor includes an annular region surrounded with an outer boundary line and an inner boundary line, and
wherein the outer boundary line and the inner boundary line comprise circles having centers, and the centers are eccentric.

2. A projection display device comprising:
an illumination optical system including the phosphor color wheel according to claim 1, a rotary driver for driving the substrate to rotate, and a light source for applying excitation light to the phosphor color wheel;
a light valve for modulating light incident from the illumination optical system according to an image signal; and
a projection optical system for projecting the light modulated by the light valve to an external screen, wherein:
the light source is disposed so that a locus of the excitation light applied from the light source during rotation of the phosphor color wheel is formed over the inside and the outside of the applied region of the phosphor on the substrate of the phosphor color wheel; and
the phosphor emits fluorescent light different in wavelength from the excitation light when irradiated with the excitation light from the light source.

3. A phosphor color wheel comprising:
a substrate driven to rotate; and
a phosphor annularly applied on a surface of the substrate,
wherein a center of an applied region of the phosphor is different from a rotational center of the substrate which is located in the substrate,
wherein the applied region of phosphor includes an annular region surrounded with an outer boundary line and an inner boundary line, and
wherein a center axis of the outer boundary line and a center axis of the inner boundary line are shifted from each other.

4. The phosphor color wheel according to claim 3, wherein the center axis of outer boundary line and the center axis of inner boundary line are separated from each other by 2 mm or more.

5. A phosphor color wheel comprising:
a substrate driven to rotate; and
a phosphor annularly applied on a surface of the substrate,
wherein a center of an applied region of the phosphor is different from a rotational center of the substrate which is located in the substrate, and
wherein the phosphor is annularly applied on the surface of the substrate such that the applied region of phosphor is formed into a distorted annular shape wider on a first side and narrower on an opposite side.

6. The phosphor color wheel according to claim 3, wherein the phosphor is annularly applied on the surface of the substrate such that the applied region of phosphor is formed into a distorted annular shape wider on a first side and narrower on an opposite side.

7. A projection display device comprising:
an illumination optical system including the phosphor color wheel according to claim 3, a rotary driver for driving the substrate to rotate, and a light source for applying excitation light to the phosphor color wheel;
a light valve for modulating light incident from the illumination optical system according to an image signal; and
a projection optical system for projecting the light modulated by the light valve to an external screen, wherein:
the light source is disposed so that a locus of the excitation light applied from the light source during rotation of the phosphor color wheel is formed over the inside and the outside of the applied region of the phosphor on the substrate of the phosphor color wheel; and
the phosphor emits fluorescent light different in wavelength from the excitation light when irradiated with the excitation light from the light source.

8. A projection display device comprising:
an illumination optical system including the phosphor color wheel according to claim 5, a rotary driver for driving the substrate to rotate, and a light source for applying excitation light to the phosphor color wheel;
a light valve for modulating light incident from the illumination optical system according to an image signal; and
a projection optical system for projecting the light modulated by the light valve to an external screen, wherein:
the light source is disposed so that a locus of the excitation light applied from the light source during rotation of the phosphor color wheel is formed over the inside and the outside of the applied region of the phosphor on the substrate of the phosphor color wheel; and the phosphor emits fluorescent light different in wavelength from the excitation light when irradiated with the excitation light from the light source.

\* \* \* \* \*